(12) United States Patent
Zehrer

(10) Patent No.: US 7,988,541 B1
(45) Date of Patent: Aug. 2, 2011

(54) MEAT PULLING APPARATUS

(76) Inventor: Robert Zehrer, St. Louis, MO (US)

( * ) Notice: Subject to any disclaimer, the term of this patent is extended or adjusted under 35 U.S.C. 154(b) by 291 days.

(21) Appl. No.: 12/387,051

(22) Filed: Apr. 27, 2009

Related U.S. Application Data

(60) Provisional application No. 61/125,805, filed on Apr. 30, 2008.

(51) Int. Cl.
*A22C 18/00* (2006.01)

(52) U.S. Cl. .................................................. 452/149

(58) Field of Classification Search ................. 452/135, 452/139, 141–144, 149, 150
See application file for complete search history.

(56) References Cited

U.S. PATENT DOCUMENTS

| | | | |
|---|---|---|---|
| 5,114,379 A * | 5/1992 | Prosenbauer | 452/142 |
| 5,149,294 A * | 9/1992 | Storesund | 452/10 |
| 5,383,809 A * | 1/1995 | Paoli | 452/138 |
| 5,547,420 A * | 8/1996 | Stikeleather et al. | 452/138 |
| 5,713,788 A * | 2/1998 | Ferket et al. | 452/138 |
| 5,775,986 A * | 7/1998 | Law et al. | 452/141 |
| 5,899,803 A * | 5/1999 | Welch | 452/198 |
| 5,997,393 A * | 12/1999 | Tornberg | 452/129 |
| 7,867,067 B2 * | 1/2011 | Dancy et al. | 452/5 |

* cited by examiner

*Primary Examiner* — Thomas Price
(74) *Attorney, Agent, or Firm* — Kevin L. Klug

(57) ABSTRACT

A meat pulling apparatus having a hopper and a rotating drum with a plurality of pins or rippers capable of pulling or shredding a food material. The hopper having one or more meat stops which assist in the pulling or shredding and prohibit the food material in an upper portion of the hopper from entering a lower portion of the hopper until the food material is pulled or shredded. The apparatus is capable of resting on or positioning over a receptacle which collects the pulled or shredded food product. One or more comb strips separate or clean the pulled or shredded food product from the drum and the pins or rippers. The drum is preferably rotated via the coupling of an electric motor therewith yet may utilize manual or other rotary type drives. A feed cover having a magnetic safety portion assists in food product feeding and promotes user safety.

20 Claims, 20 Drawing Sheets

MEAT PULLING APPARATUS

This application claims priority of U.S. Provisional Patent Application No. 61/125,805, filed Apr. 30, 2008, entitled Meat Pulling Apparatus.

BACKGROUND OF THE INVENTION

The art of the present invention relates to meat or food processing devices in general and more particularly to an apparatus and method of use which pulls or shreds cooked meat into smaller more edible and tender portions. The art of the present invention is especially useful with pork which is often "pulled" for placement onto sandwiches or to be served alone.

Foodstuffs and especially meats such as chicken, turkey, beef, pork, and fish are prepared in a plurality of forms with a variety of textures. The forms include but are not limited to pulling or shredding. When utilizing a pulling or shredding technique, the meat fiber is separated or reduced into a user desirable texture and/or size. Often the texture or size is formed as meat strands which lends to the term "pulling".

Traditionally, a pair of conventional forks have been utilized to manually pull apart the meat in order to form the "pulled" portions. Unfortunately, this prior art technique is time consuming and inefficient, especially for restauranteurs. The present art apparatus and method of using the same separates or "pulls" the meat in a timely fashion and with a substantially uniform texture and form.

The present art utilizes a hopper within which is located a motor driven rotating drum having a plurality of pins or rippers which "pull" the meat. One or more blocks or meat stops prohibit the meat from entering a lower portion prior to being "pulled" and one or more comb strips separate the pulled meat from the drum whereby it may easily fall into a collection receptacle. The present art allows an operator or restauranteur to insert meat into an upper portion, activate the apparatus, and collect "pulled" meat in a collection receptacle below the apparatus, all with a minimum amount of effort and a maximum amount of safety.

Accordingly, it is an object of the present invention to provide a meat pulling apparatus which minimizes the time necessary to produce a pulled meat and maximizes the amount of pulled meat which may be produced by a restauranteur.

Another object of the present invention is to provide a meat pulling apparatus which is easily disassembled and cleaned.

A further object of the present invention is to provide a meat pulling apparatus which minimizes the chances of clogging.

A yet further object of the present invention is to provide a meat pulling apparatus which minimizes any safety hazards to the operator or user.

SUMMARY OF THE INVENTION

In its preferred form, the art of the present invention utilizes a uniquely shaped hopper into which the meat portions are placed and which has a rotating drum with a plurality of pins or rippers extending therefrom which reduce or "pull" the meat into the constituent fiber or strand portions. In a preferred embodiment, the drum is powered via a motor connected via a shaft coupler and coupling shaft. Preferably said motor has an integral gear reducer which increases the torque and reduces the rotary velocity.

The preferred embodiment of the hopper has an upper portion and a lower portion and represents a substantially rectangular cross section. The drum is preferably of a cylindrical shape having a diameter less than the width of the hopper. Each of the pins or rippers is pressed into and held within a separate hole within the drum. Also for the preferred embodiment, the pins or rippers are positioned on a first side of the drum surface and extend substantially perpendicularly to a tangent of the drum with the remaining pins or rippers positioned substantially opposite the first pins on the drum surface.

Within said hopper one or more blocks or meat stops are mounted onto one or more sidewalls of said hopper between said drum and the sidewall and further provide a thorough pulling or shredding of the meat or food product. The blocks or meat stops are preferably positioned substantially parallel with the center axis of the drum and tangential to the drum surface. The blocks or meat stops are positioned to provide a clearance to the drum and pins while prohibiting larger strips or portions of meat or food product from exiting the upper portion of the hopper.

For the preferred embodiment, a feed cover is provided which is sized to fit within the upper portion of the hopper, protect the user, and allow the user to impart a downward force onto the meat or food product placed within the hopper. The preferred embodiment of the cover sidewalls further have one or more magnets or magnetic strips mounted thereupon and allow a reed, hall effect, or other type of magnetic switch electrically positioned or connected inline with the motor power supply to close when the cover is inserted into the upper portion of the hopper. The magnet and switch combination prohibit apparatus operation unless the cover is inserted which further ensures user safety.

The lower portion of the hopper has one or more comb strips mounted with the apparatus which separate or clean the pulled or shredded meat or food product from the drum and pins or rippers. The comb strips have a plurality of teeth which are separated in order to provide clearance for the pins or rippers as the drum rotates. The comb teeth preferably are positioned very close to the drum but may actually contact the drum in alternative embodiments.

The art of the present invention may be manufactured from a plurality of materials including but not limited to metals and alloys thereof, plastics, composites, or ceramics without departing from the scope and spirit herein intended. The apparatus may further be manufactured via molding, machining, casting, forging, pressing, laminating, carving, or utilization of stereo-lithographic or electro-dynamic milling or other techniques which are appropriate for the material utilized. For the preferred embodiment, the drum, hopper, housings, and pins or rippers are manufactured from a stainless steel.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1:
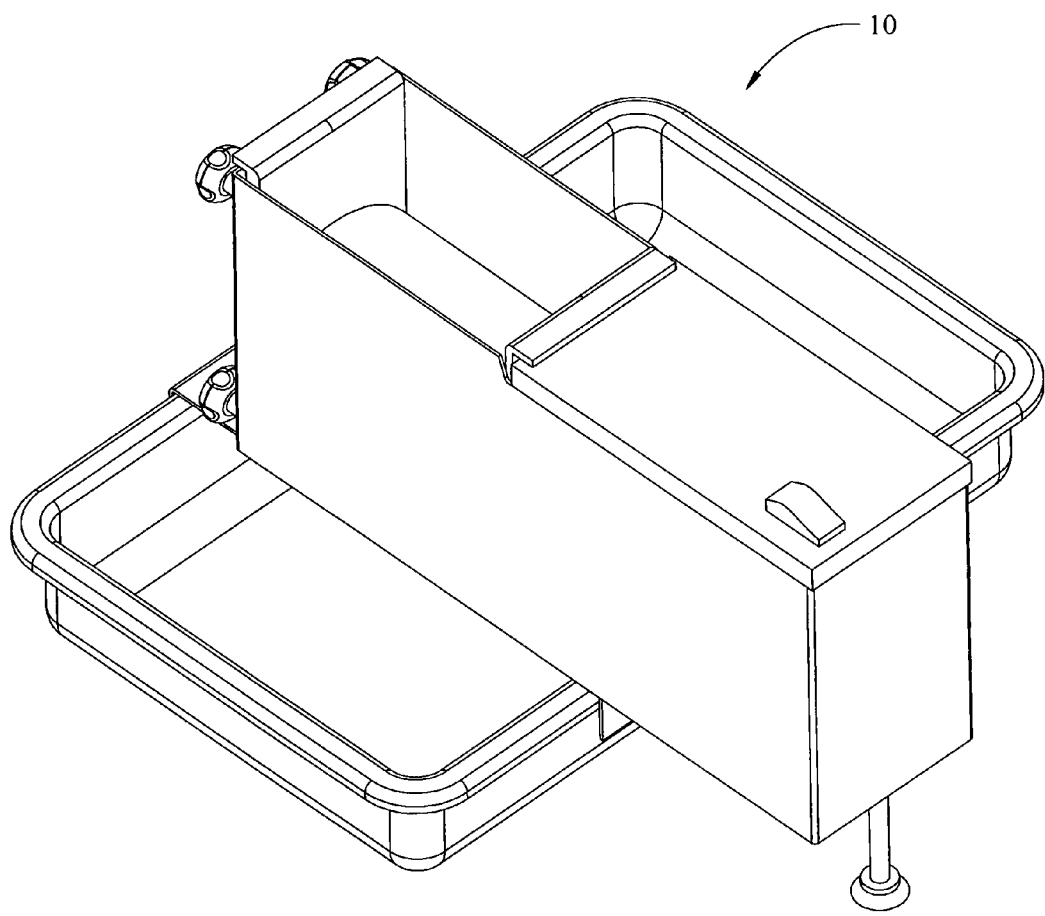
FIG. 1 is a left front perspective view of a meat pulling apparatus mounted atop a collection receptacle.
Figure 2:
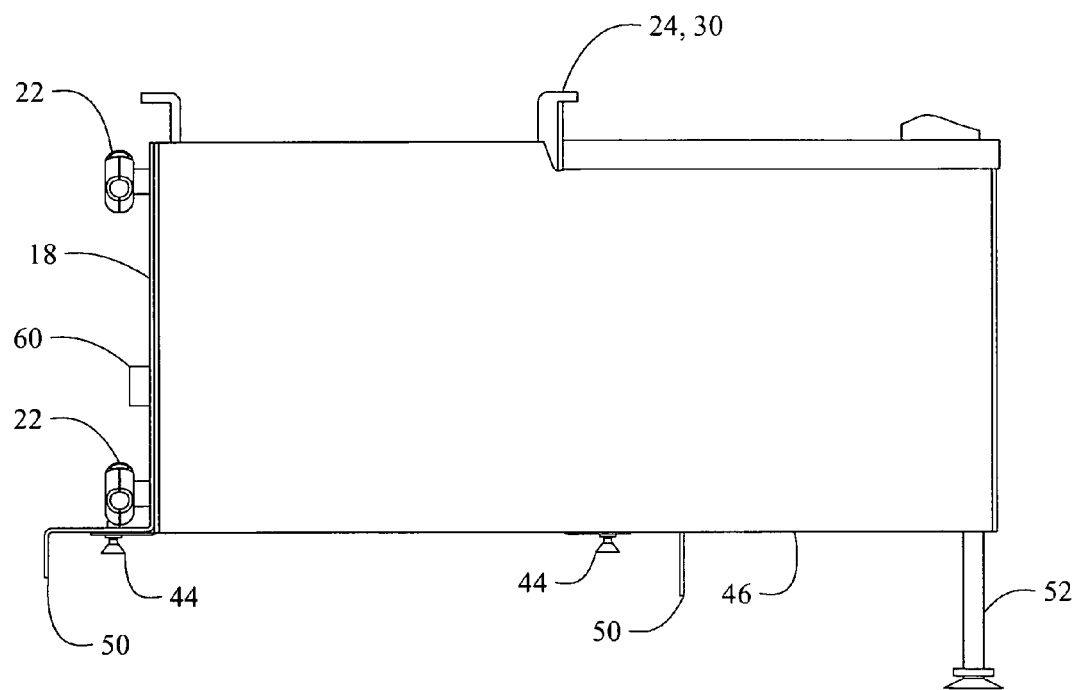
FIG. 2 is a right plan view of a meat pulling apparatus which is substantially symmetrical with a left plan view.
Figure 3:
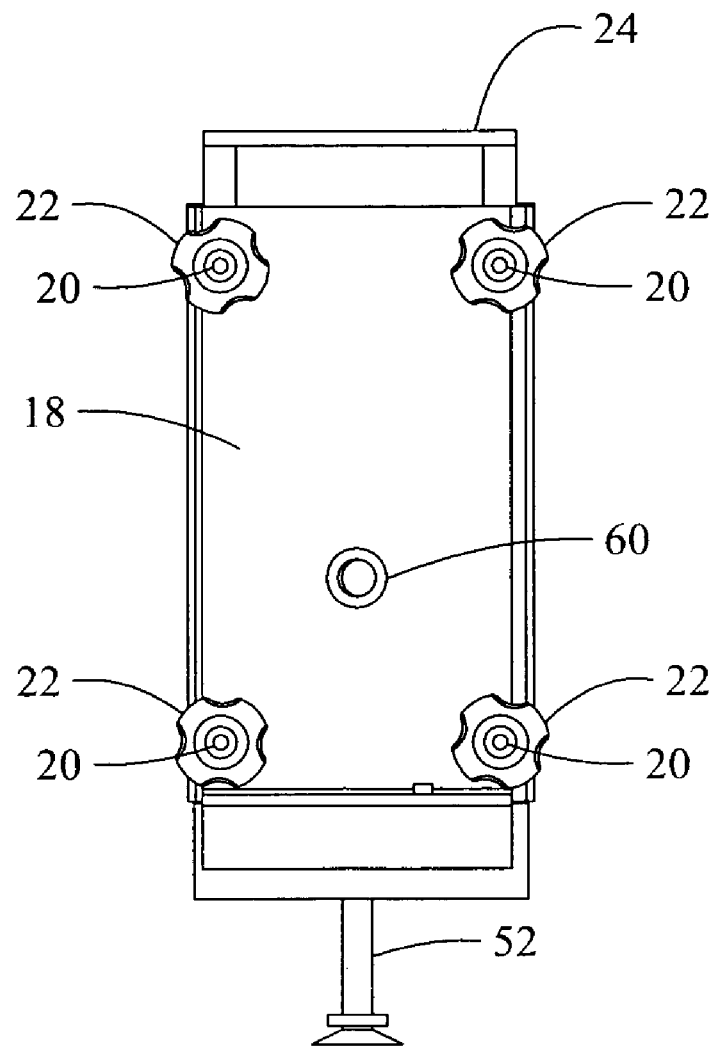
FIG. 3 is a rear plan view thereof.
Figure 4:
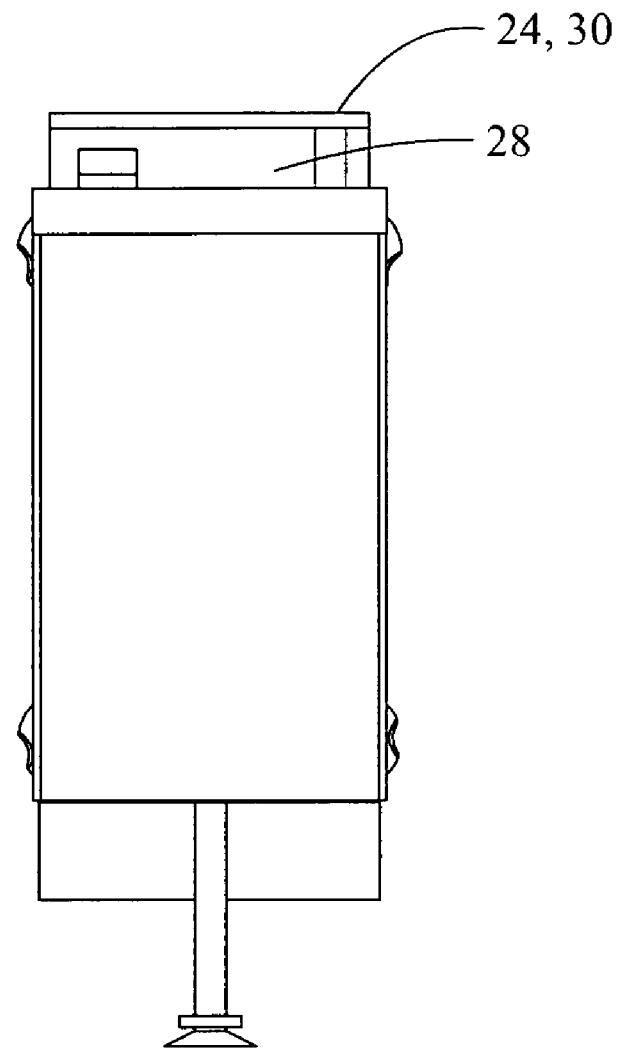
FIG. 4 is a front plan view thereof.
Figure 5:
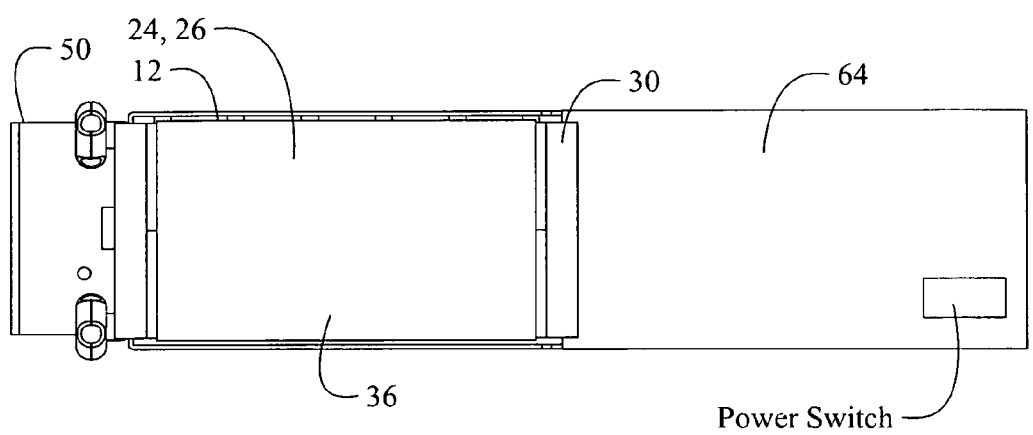
FIG. 5 is a top plan view thereof.
Figure 6:
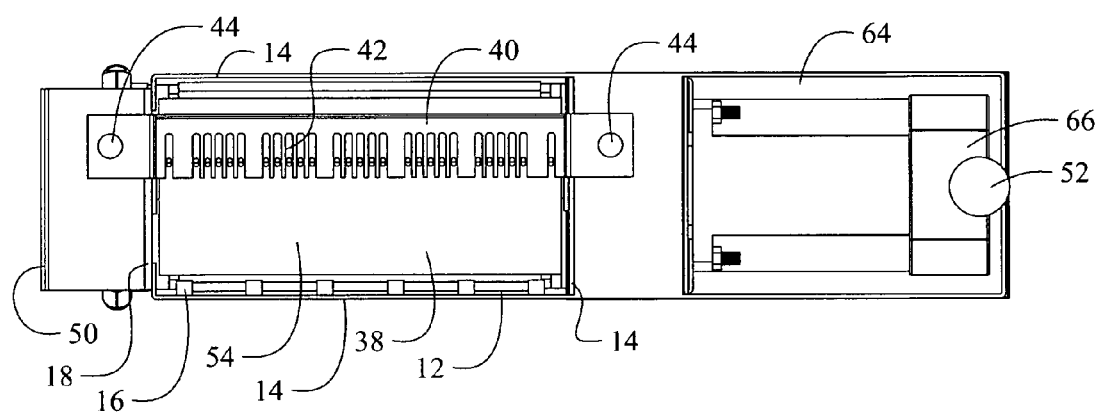
FIG. 6 is a bottom plan view thereof.
Figure 7:
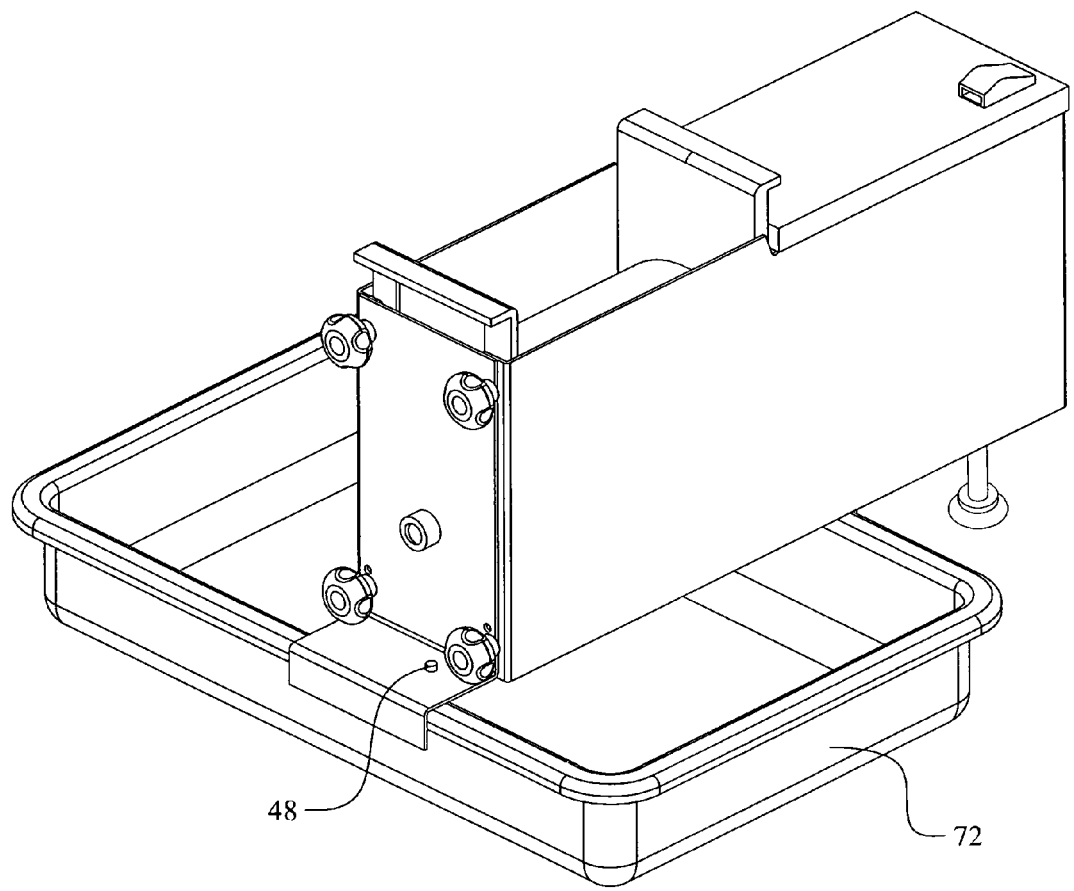
FIG. 7 is a left rear perspective view of a meat pulling apparatus mounted atop a collection receptacle.
Figure 8:
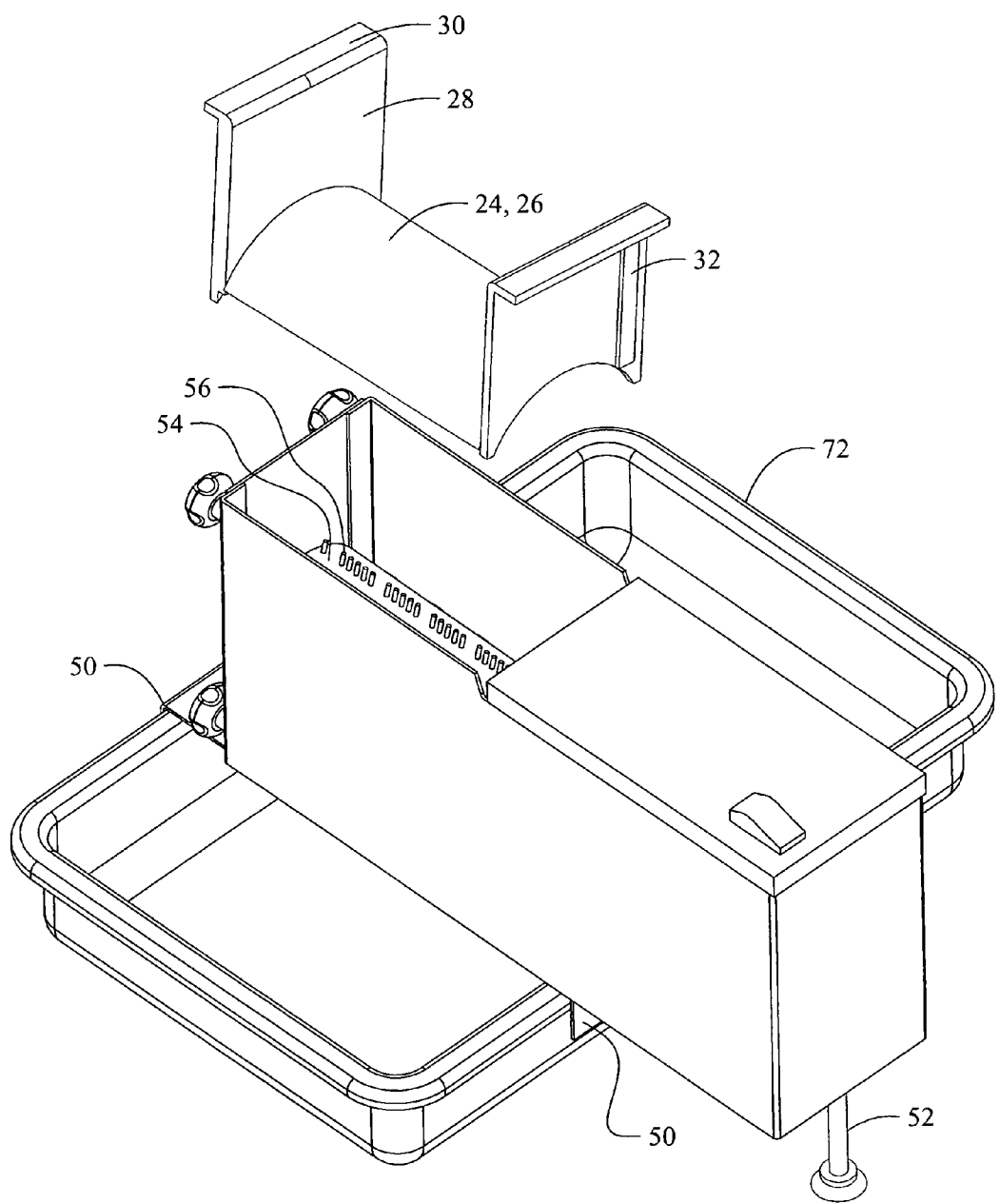
FIG. 8 is a left front perspective view of a meat pulling apparatus mounted atop a collection receptacle with the feed cover removed.
Figure 9:
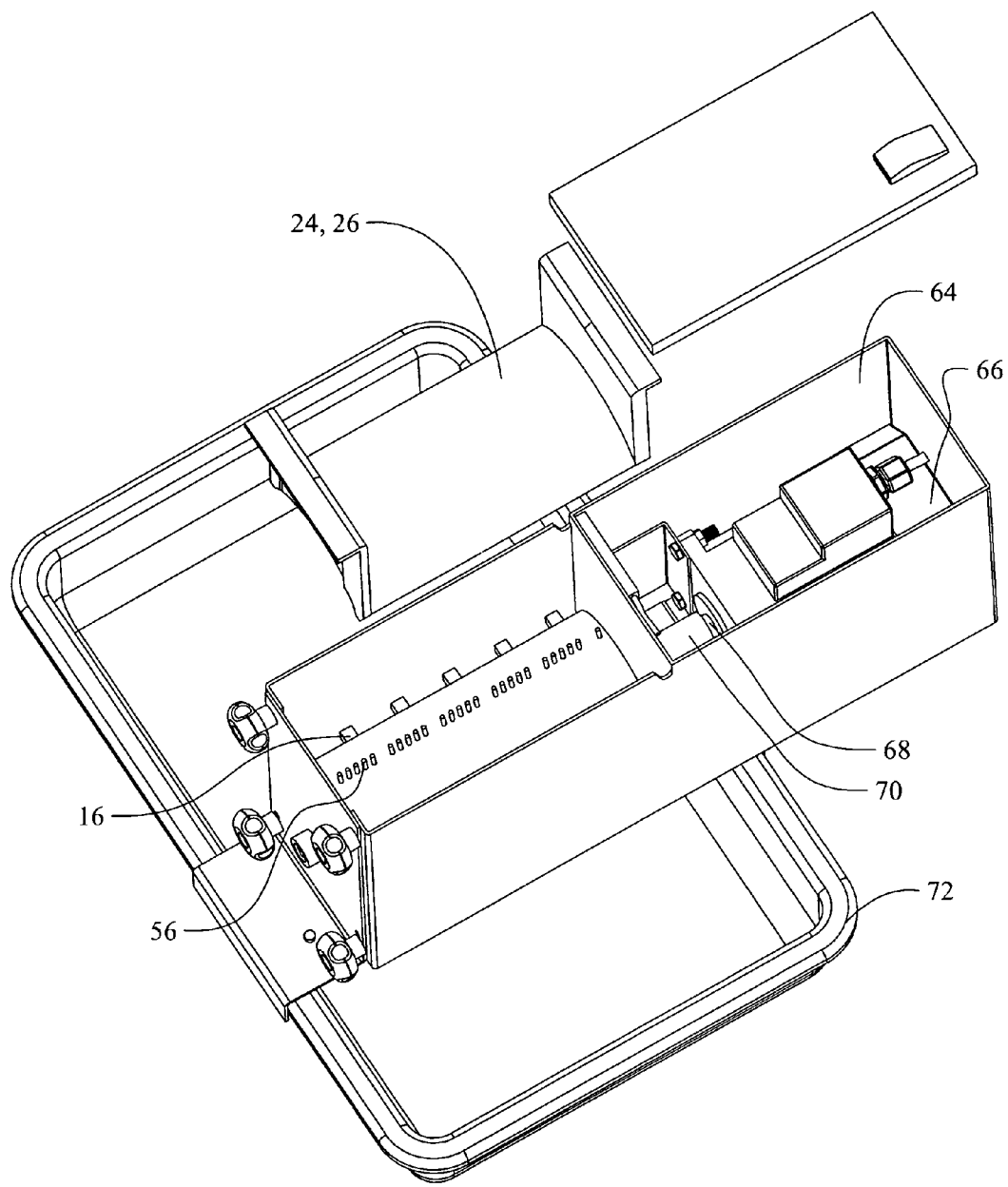
FIG. 9 is a top perspective view of a meat pulling apparatus mounted atop a collection receptacle with the feed cover and motor housing cover removed.
Figure 10:
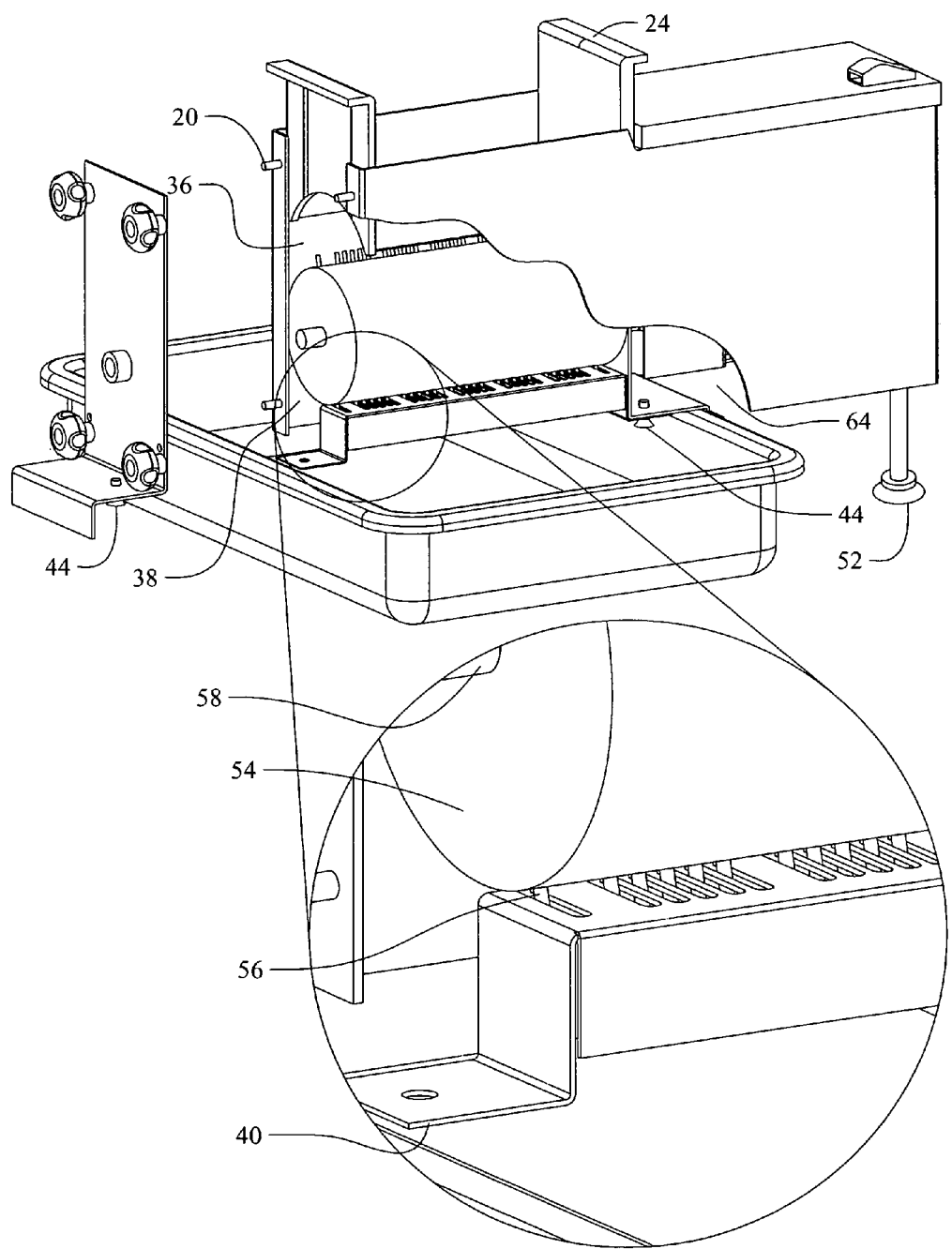
FIG. 10 is a right perspective view of a meat pulling apparatus mounted atop a collection receptacle showing an x-ray view of the drum and comb strip(s).
Figure 11:
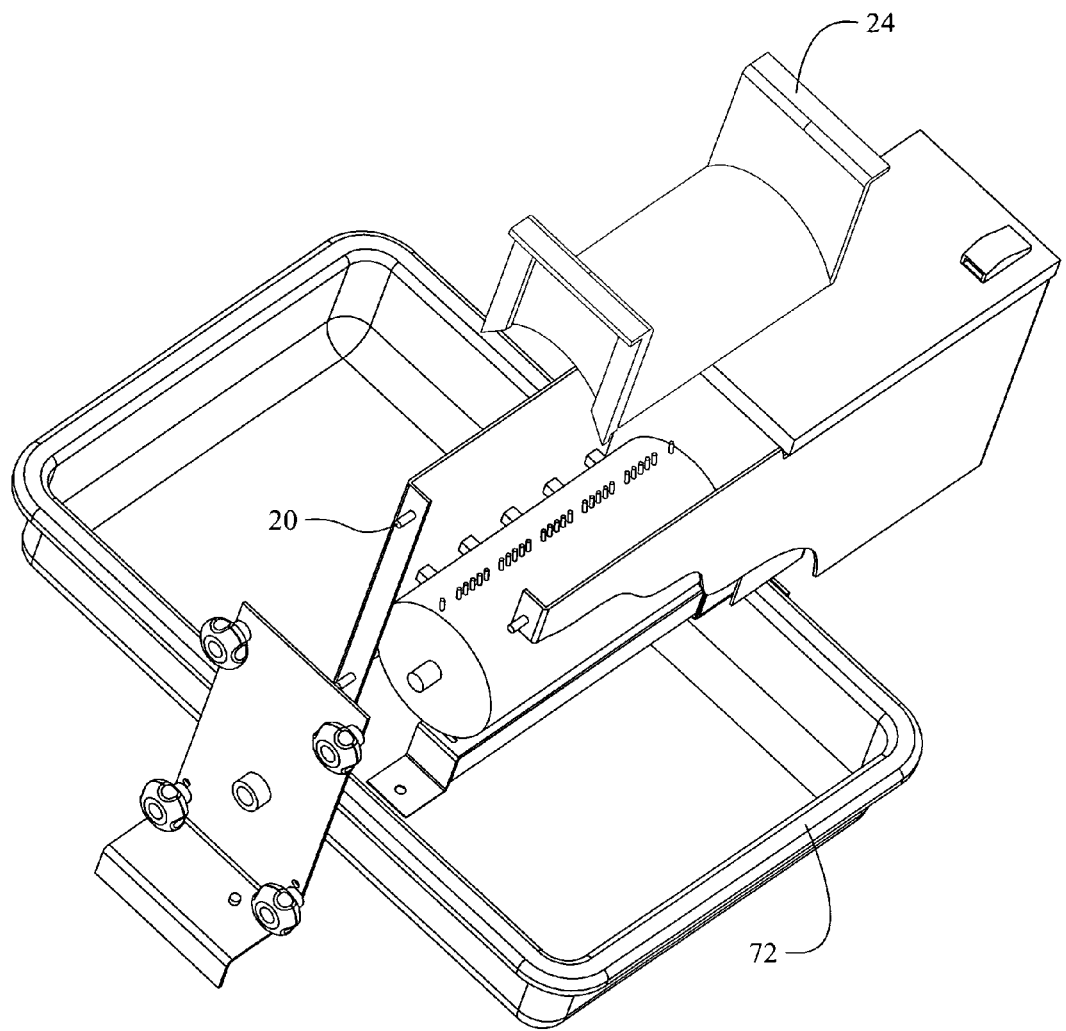
FIG. 11 is a top perspective view of a meat pulling apparatus mounted atop a collection receptacle showing an x-ray view of the drum and comb strip(s) and the removable wall removed.
Figure 12:
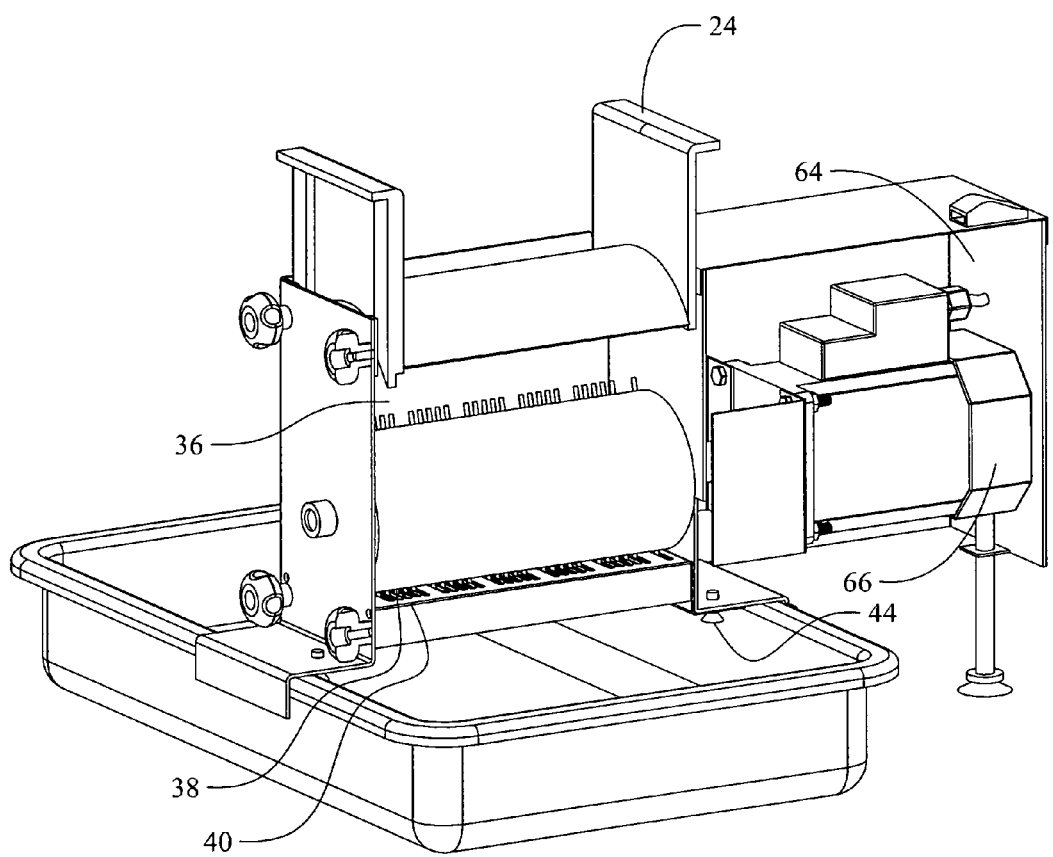
FIG. 12 is a right rear perspective view of a meat pulling apparatus mounted atop a collection receptacle showing an x-ray view of the internal components.
Figure 13:
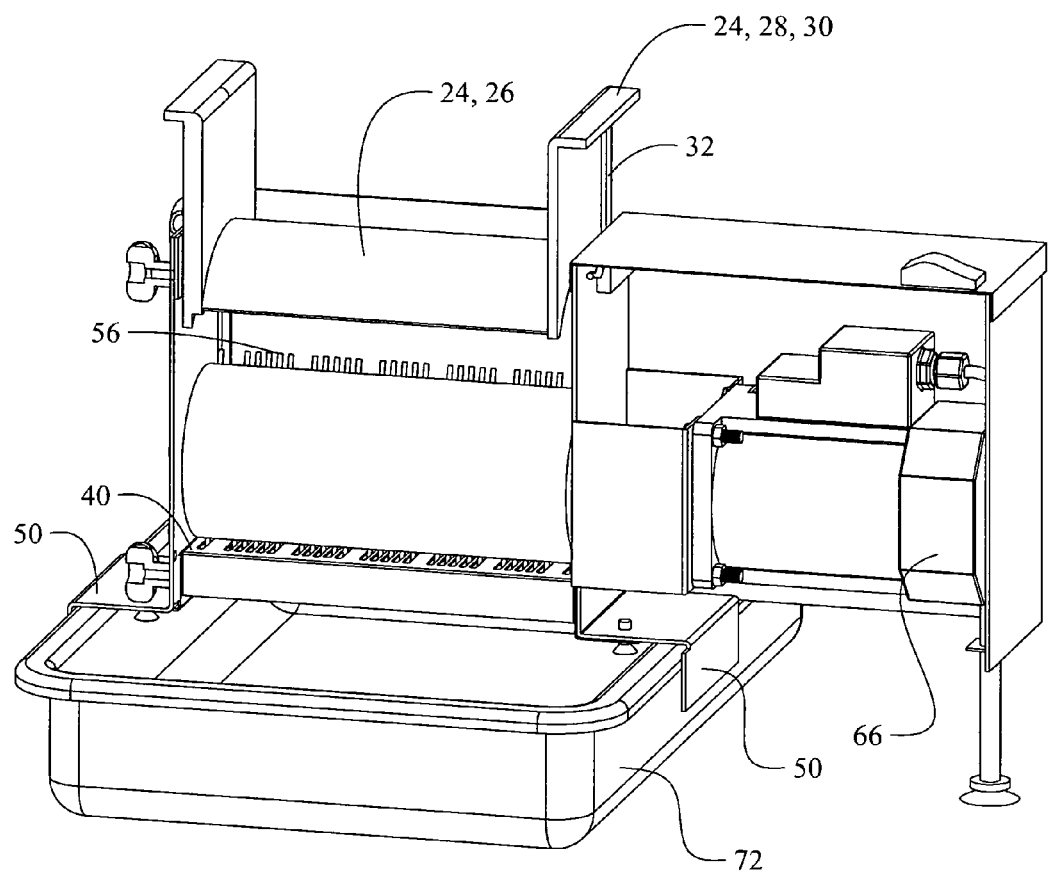
FIG. 13 is a right front perspective view of a meat pulling apparatus mounted atop a collection receptacle showing an x-ray view of the internal components.
Figure 14:
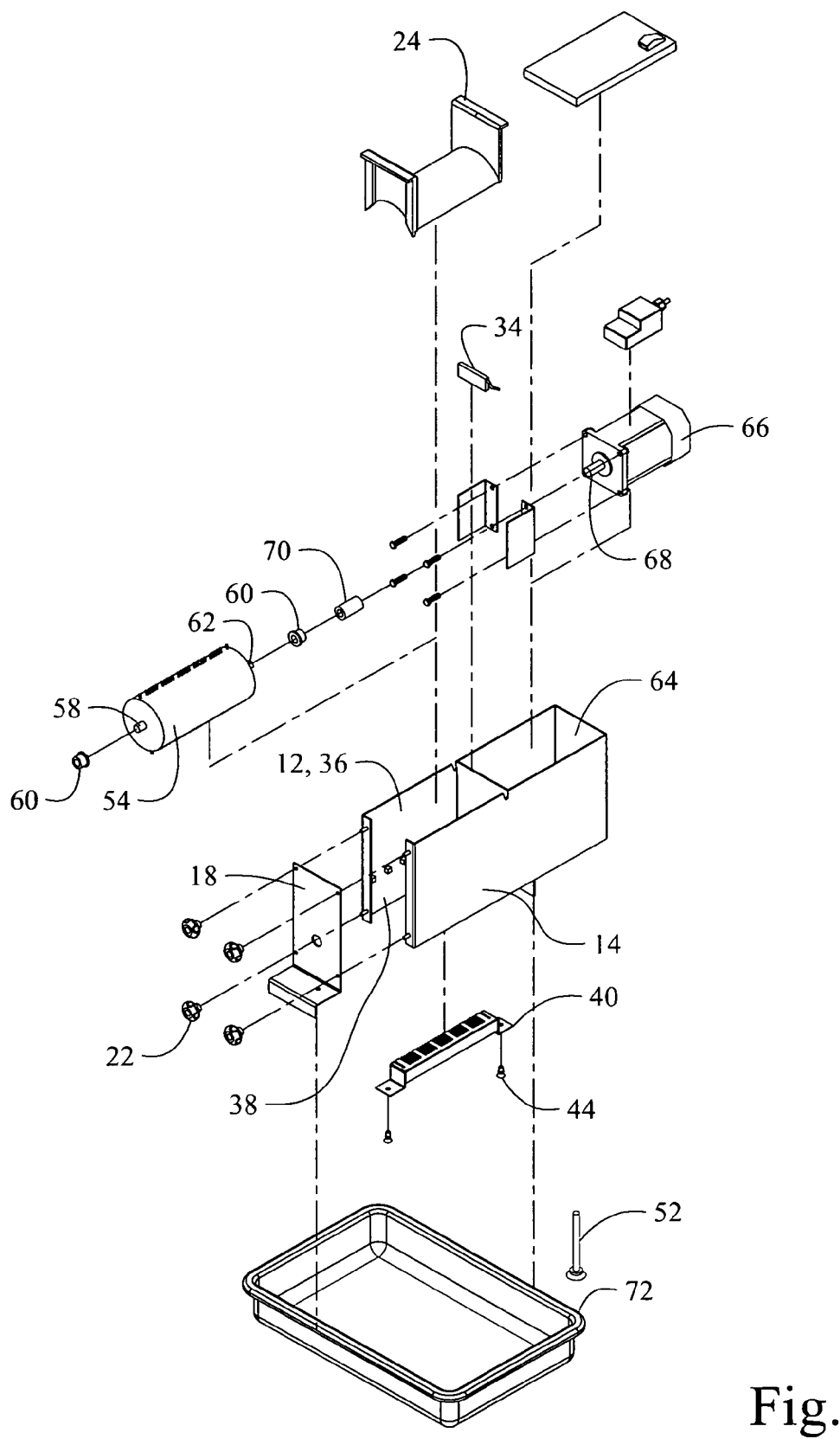
FIG. 14 is a right rear perspective exploded view of a meat pulling apparatus mounted atop a collection receptacle.
Figure 15:
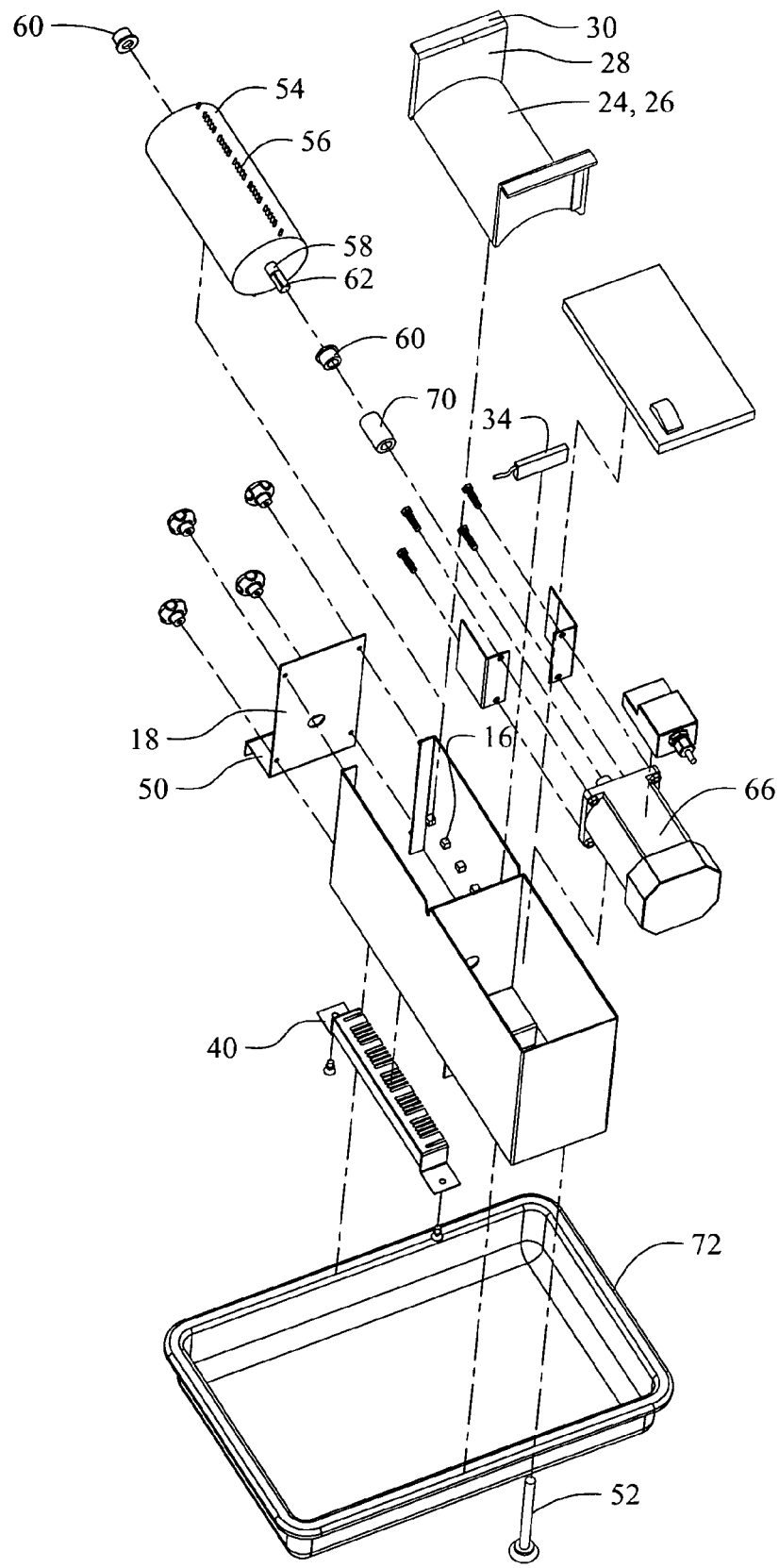
FIG. 15 is a right front perspective exploded view of a meat pulling apparatus mounted atop a collection receptacle.
Figure 16:
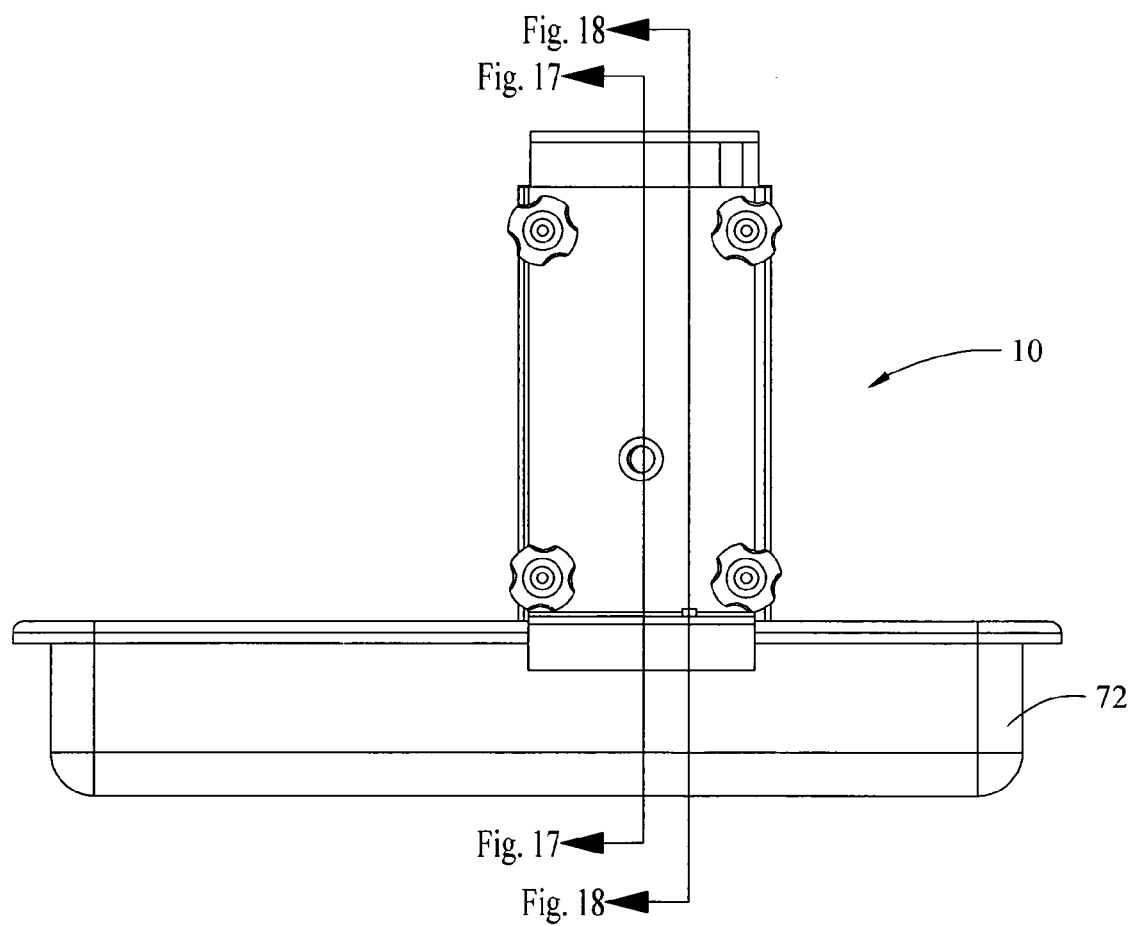
FIG. 16 is a rear plan view of a meat pulling apparatus mounted atop a collection receptacle.
Figure 17:
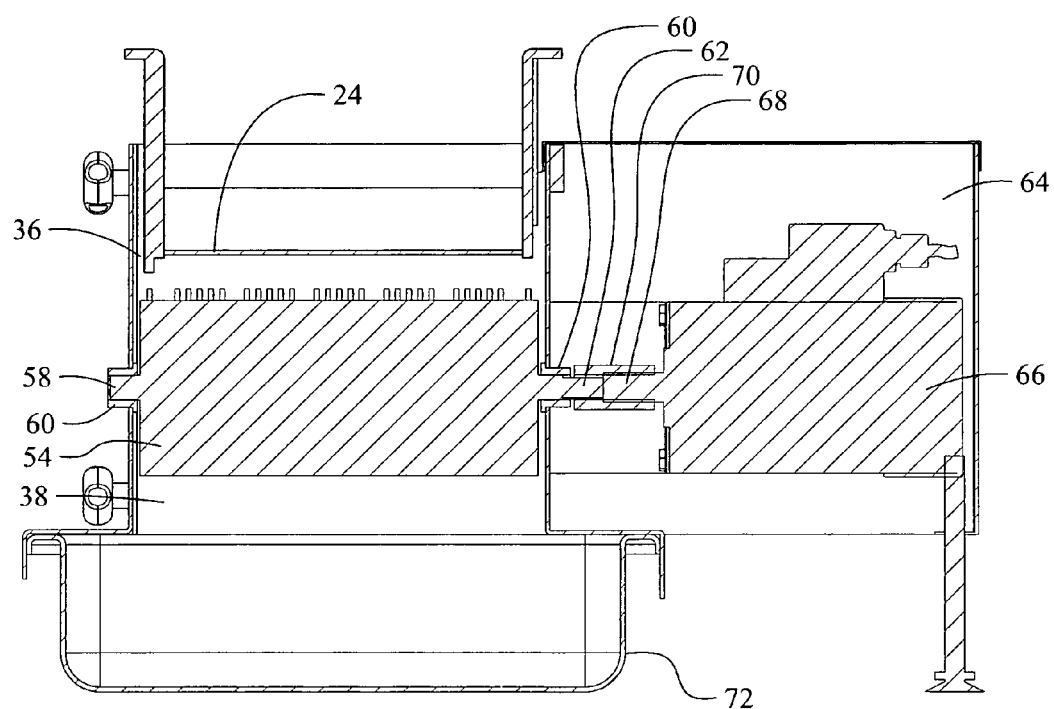
FIG. 17 is a cross sectional view taken along lines 17-17 of FIG. 16.
Figure 18:
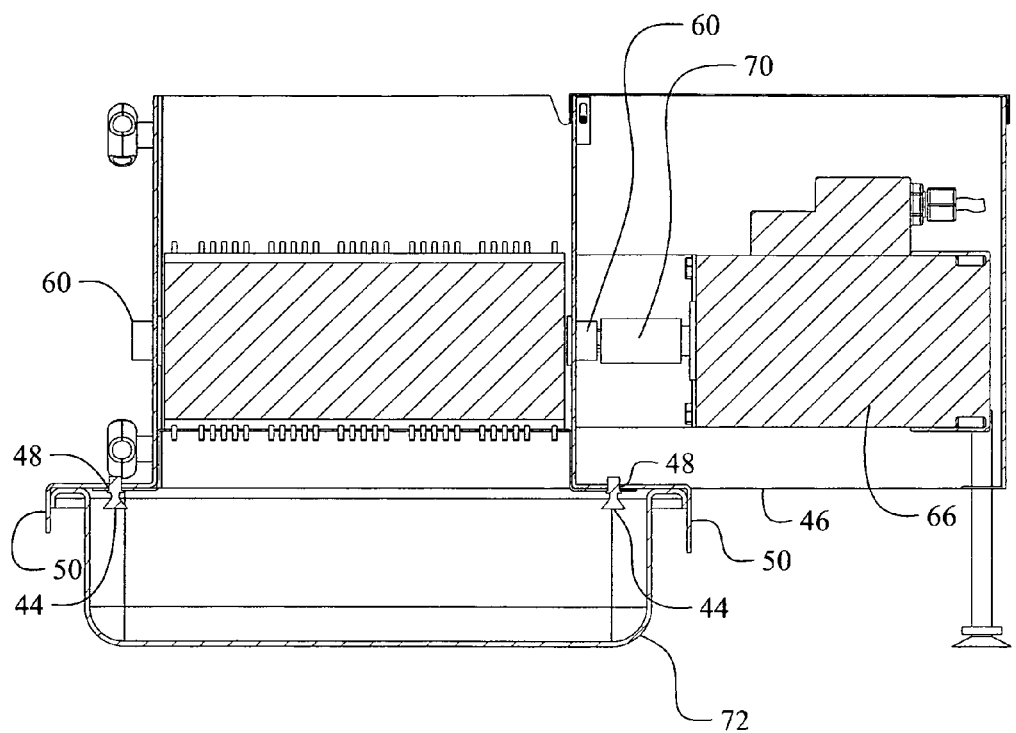
FIG. 18 is a cross sectional view taken along lines 18-18 of FIG. 16.
Figure 19:
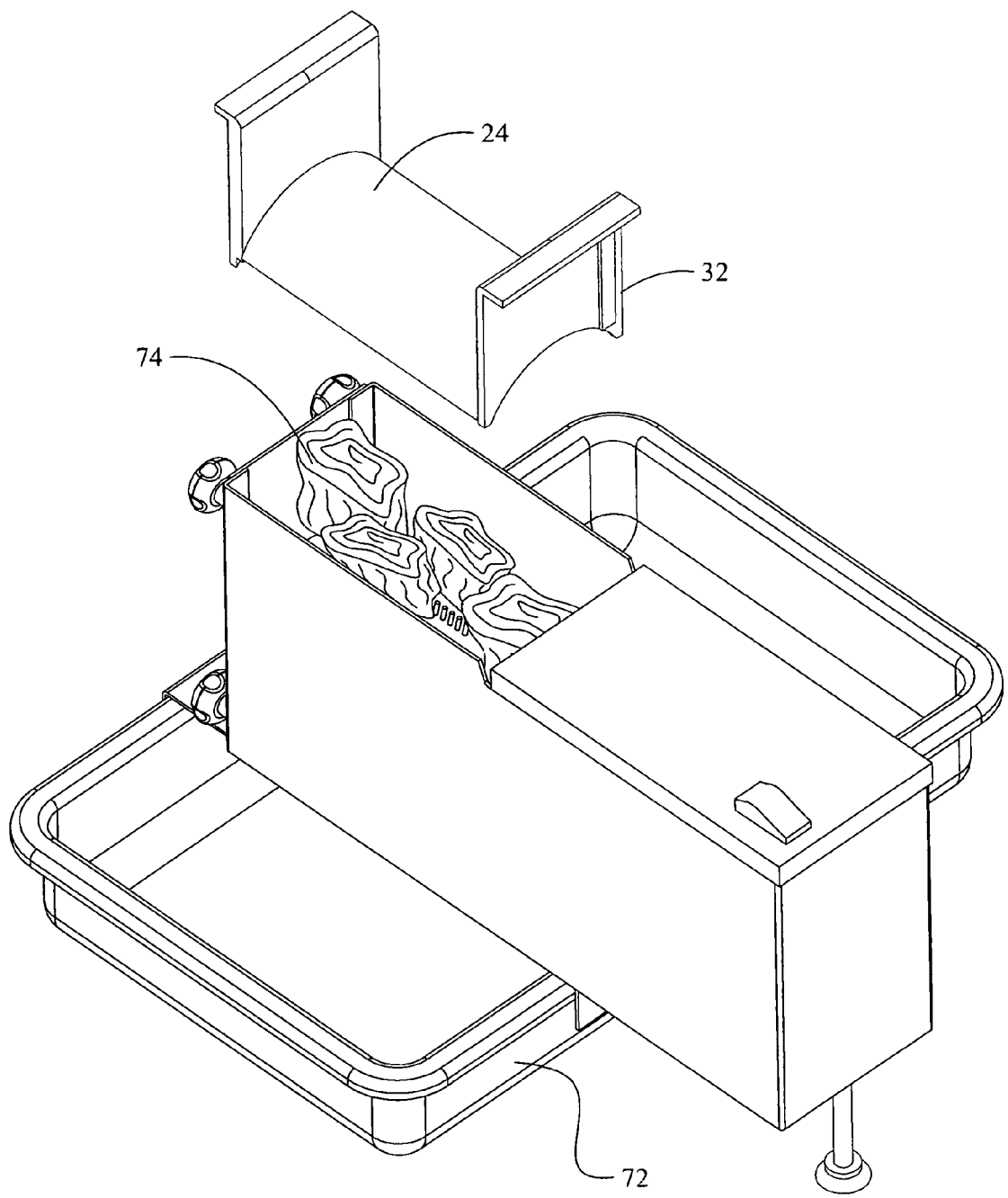
FIG. 19 is a top front perspective view of a meat pulling apparatus mounted atop a collection receptacle showing placement of food product within the upper portion of the hopper.
Figure 20:
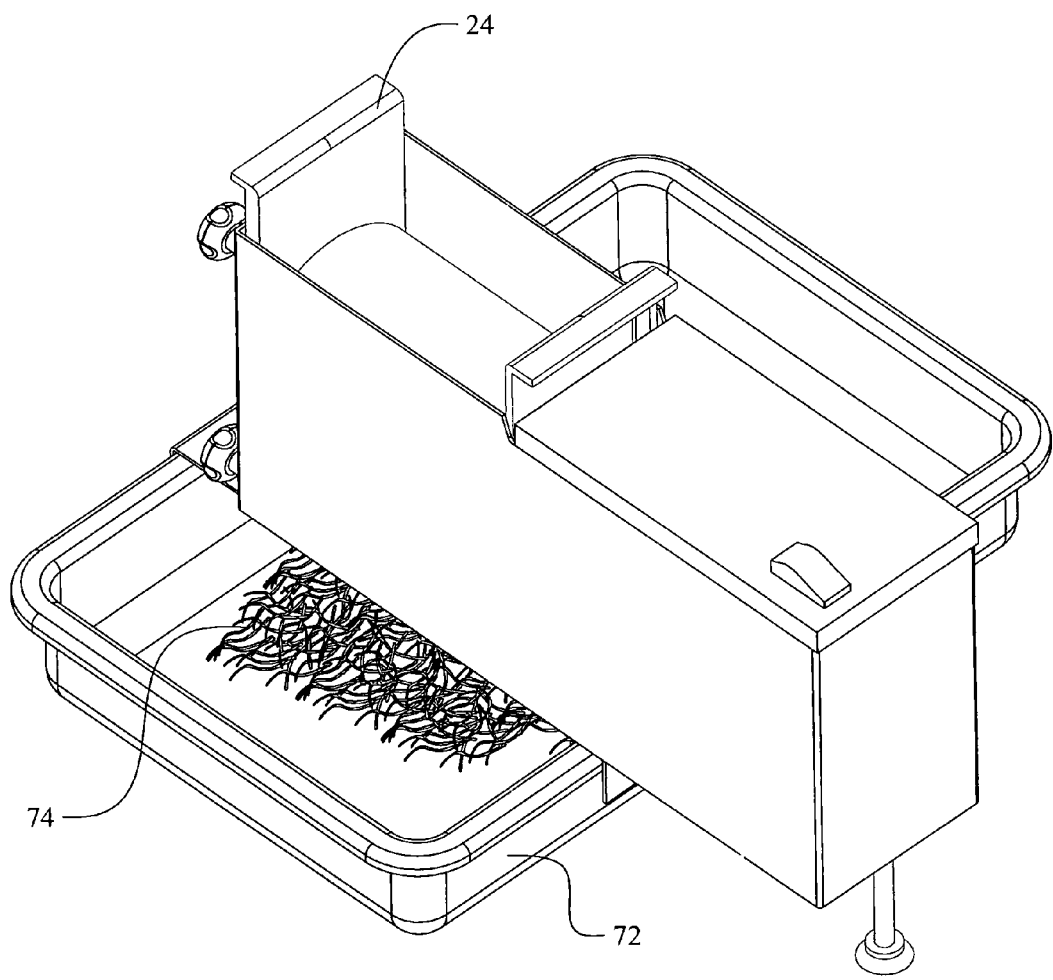
FIG. 20 is a top front perspective view of a meat pulling apparatus mounted atop a collection receptacle showing the pulled or shredded food product within the receptacle.

Referring now to the drawings, there is shown in the Figures a preferred embodiment of a meat pulling apparatus 10. In its preferred form, the art of the present invention 10 utilizes a uniquely shaped hopper 12 into which the meat portions are placed and which has a rotating drum 54 with a plurality of pins or rippers 56 extending therefrom which reduce or "pull" the meat into the constituent fiber or strand portions. In a preferred embodiment, the drum 54 is powered via a motor 66 connected via a shaft coupler 70 and coupling shaft 68. Preferably said motor 66 has an integral gear reducer which increases the torque and reduces the rotary velocity. A preferred embodiment of the present art utilizes a ⅙$^{th}$ horsepower electric induction motor operating with 110 volt 60 hertz power. Alternative embodiments may utilize motors having a plurality of power ratings or utilize pneumatic or hydraulic motors or provide a crank mechanism for manual rotation of the drum. Alternative embodiments may further provide a coupling via a plurality of means, including but not limited to chain or belt drives, gear drives, frictional drives, flexible shafts, or direct drives.

The preferred embodiment of the hopper 12 has an upper portion 36 and a lower portion 38 and represents a substantially rectangular cross section of approximately 5 inches width by 10 inches length with a depth of approximately 10 inches. Alternative embodiments of the hopper 12 may take a plurality of forms and cross sections including but not limited to cubic, elliptical, spherical, or conical. The drum 54 with the plurality of pins or rippers 56 is slightly smaller than the width and length of the substantially rectangular hopper 12 in order to provide a clearance. In the preferred embodiment, the drum 54 has an extending shaft 58 at each end. Each of said shafts 58 rotatably mate with a separate bearing 60 at each end of the hopper 12 in the preferred embodiment. The shaft 58 end which mates with the motor 66 or coupling shaft 68 is preferably slightly longer and has a square cross section portion 62 which mates with a square section of the shaft coupler 70. In the preferred embodiment, the bearings 60 are of a polymeric material which are held via the sidewalls of the hopper and have a hole for rotatable acceptance of the shafts 58. Alternative embodiments may forego use of the bearings or utilize other staple forms of bearings as recognized by those skilled in the arts.

The drum 54 is preferably of a cylindrical shape having a diameter less than the width of the hopper. Alternative embodiments may utilize drums having a plurality of shapes or cross sections, including but not limited to conical, rectangular, or elliptical. Each of the pins or rippers 56 are pressed into and held within a separate hole within the drum. In a preferred embodiment the pin 56 diameter is approximately ⅛ inch and extends approximately ⅜ inch from the drum 54 surface with each pin 56 separated from an adjacent pin by approximately ¼ inch center-to-center. Also for the preferred embodiment, a total of 54 pins or rippers 56 are utilized with the first 27 pins or rippers 56 positioned on a first side of the drum 54 surface and extending substantially perpendicularly to a tangent of the drum 54. The remaining 27 pins or rippers 56 are positioned substantially opposite the first 27 pins 56 on the drum 54 surface in a preferred embodiment. That is, the remaining 27 pins or rippers 56 also extend substantially perpendicularly to a tangent of the drum 54 but at a location which is approximately 180 degrees of rotation relative to the first 27 pins. Preferably the drum 54 has a hollow interior but alternative embodiments may utilize a drum 54 having a filled or solid core. The pins or rippers 56 may take a plurality of forms and cross sections, including but not limited to cylindrical, square, elliptical, sharpened edge forms, or combinations of the aforesaid. The pins or rippers 56 may further be formed separately from or integrally with the drum 54 and positioned at a plurality of locations on said drum 54.

The extending shaft 58 of the drum 54 is coupled with said motor 66 via a shaft coupler 70. Preferably said motor 66 is housed within a motor housing 64 which is separated from the hopper 12 with the drum shaft 58 having the square cross section portion 62 transitioning between the two cavities or housings 12, 64. Alternative embodiments may not enclose the motor 66 or may place the motor 66 integral with the drum 54. Further alternative embodiments may utilize shaft 58 cross sections and/or couplers 70 which take a plurality of forms, including but not limited to keyed, pressed, frictional, or splined.

Within said hopper 12 one or more blocks or meat stops 16 are mounted onto or with one or more sidewalls 14 of said hopper 12 between said drum 54 and the sidewall 14 and further provide or allow a thorough pulling or shredding of the meat or food product 74. The blocks or meat stops 16 are positioned substantially parallel with the center axis of the drum 54 and tangential to the drum 54 surface and are approximately of a ⅜ inch cube form with a separation from block-to-block of approximately 1¾ inches center-to-center for a preferred embodiment. For the preferred embodiment, five blocks or meat stops 16 are mounted upon the sidewall 14 of the hopper 12. Each block or meat stop 16 is positioned between every five pins or rippers 56 which extend from the drum 54 with the exception of the single pins 56 at each end of the drum 54. That is, with the exception of the end single pins 56, the pins or rippers 56 have a greater adjacent separation, i.e. approximately ⅝ inch, where each block 16 is positioned upon the hopper sidewall 14. The blocks or meat stops 16 are positioned to provide a clearance to the drum 54 and pins 56 while prohibiting larger strips or portions of meat or food product 74 from exiting the upper portion 36 of the hopper 12. Alternative embodiments may incorporate blocks or meat stops 16 having a plurality of shapes and forms, including but not limited to circular, elliptical, knife edge, or serrated and may further be mounted separately or integrally with said hopper 12. Further alternative embodiments may forego use of the blocks or meat stops 16.

For the preferred embodiment, a feed cover 24 is provided which is sized to fit within the upper portion 36 of the hopper 12, protect the user, and allow the user to impart a downward force onto the meat or food product 74 placed within the hopper 12. The feed cover 24 is preferably of a pliable polymeric material which is softer than the material of the drum 54 and pins or rippers 56. The softer material assures that the drum 54 and pins or rippers 56 are not damaged during operation. For the preferred embodiment, the feed cover 24 has a first portion 26 (or food product 74 contact portion) having a partial radius or arcuate form which is attached with two extensions or cover sidewalls 28. The extensions 28 serve as handles or grips for the first portion 26 and in the preferred embodiment have one or more "L" shaped lips 30 at the topmost portion for user gripping. The first portion 26 form fits over the meat or food product 74 during operation and allows the user to apply the downward force necessary to ensure proper pulling or shredding. Alternative embodiments may utilize a plurality of means to cover or feed the food product 74 during operation, including but not limited to lids, dowels, utensils, or mechanical feed mechanisms.

The preferred embodiment of the cover extensions or sidewalls 28 further have one or more magnets or magnetic strips 32 mounted thereupon and allow a reed, hall effect, or other type of magnetic switch 34 electrically positioned inline or in communication with the motor 66 power supply to close when the cover 24 is inserted into the upper portion 36 of the hopper 12. The magnet 32 and switch 34 combination prohibit apparatus 10 operation unless the cover 24 is inserted which further ensures user safety. In the preferred embodiment, the magnetic switch 34 is located within the motor housing 64 or the portion of the apparatus 10 which contains the motor 66. Also within the preferred embodiment, the magnet 32 is attached to an extension 28 of the feed cover 24 as a strip and allows the magnetic field thereof to activate the magnetic switch 34 through the hopper 12 sidewall 14 when the cover 24 is inserted into the hopper 12. Alternative embodiments may utilize a plurality of methods to ensure cover 24 placement, including but not limited to mechanical switches, light curtains, ultrasonic detection, or proximity detectors.

The lower portion of the hopper 12 has one or more comb strips 40 mounted with the apparatus 10 which separate or clean the pulled or shredded meat or food product 74 from the drum 54 and pins or rippers 56. The comb strips 40 have a plurality of teeth 42 which are separated in order to provide clearance for the pins or rippers 56 as the drum 54 rotates. The comb teeth 42 preferably are positioned very close to the drum 54 but may actually contact the drum 54 in alternative embodiments. Preferably the comb 40 is mounted via quick disconnect fasteners 44 to the underside 46 of the apparatus 10 whereby it may be easily and quickly removed for cleaning. That is, holes 48 are placed into the underside 46 of the apparatus 10 into which the quick disconnect fasteners 44 mate and hold the comb strip(s) 40. For the preferred embodiment, the comb strip(s) 40 substantially extends the length of the drum 54 at or within the lower portion 38 of the hopper 12 and has a number of spacings between the teeth 42 which correspond to the number of pins or rippers 56. The comb strip(s) 40 may take a plurality of forms and utilize a plurality of mounting methods, including but not limited to individual scrapers mounted with or separately with the apparatus 10, engaging teeth, or auger type separating systems. The quick disconnect fasteners 44 may embody a plurality of fastener types within alternative embodiments, including but not limited to nuts or wing nuts and threaded studs, pins, magnets, or hook and loop fasteners.

The preferred embodiment of the lower portion 38 or underside 46 of the apparatus has one or more extending lips 50 which allow a secure mating with a collection receptacle or container 72. That is, the pulled or shredded food product 74 requires collection and the apparatus 10 rests upon the collection receptacle 72 in a stable fashion. The lips 50 prohibit the apparatus 10 from sliding from the topmost portion of the receptacle 72. Also in the preferred embodiment, an adjustable height support arm 52 is placed below the cavity or housing 64 in which the motor 66 is mounted and provides additional support for the apparatus 10. The support arm 52 prevents the apparatus 10 from tipping as it sits or seats with the upper portion of the collection receptacle 72. That is, the support arm 52 is adjusted to substantially match the height of the receptacle 72 and rest upon the counter top or surface upon which the pulling or shredding operation occurs. Alternative embodiments may utilize two, three, or more support arms 52 or legs in place of or in addition to the extending lips 50. The legs allow the apparatus 10 to be placed over or above a collection receptacle or container 72 whereby the collection receptacle or container 72 may be slidably removed from the underside 46 of the apparatus 10.

The preferred embodiment of the hopper 12 has a removable wall 18 farthest from the motor 66. The removable wall 18 is preferably held with four fasteners or threaded studs 20 extending from the apparatus and preferably secured with knob nuts 22. The knob nuts 22 allow for easy removal of the wall 18 for cleaning and disassembly without the use of tools. Upon removal of the hopper wall 18, the drum 54 may be removed from the square socket within the motor shaft coupler 70 in order to facilitate cleaning. As described, the components which touch the food product 74 are removable for cleaning. Alternative embodiments may hold said removable wall 18 via a plurality of methods, including but not limited to pins, magnets, quick disconnect fasteners, or hook and loop fasteners.

In operation, the user places the apparatus 10 over the receptacle or container 72 and adjusts the support arm 52 for stability. The user then engages power to the motor 66. The user then inserts meat or other food product 74 into the upper portion 36 of the hopper 12. The user then places the feed cover 24 into the hopper 12 and over the food product 74. Upon insertion, the magnetic strip 32 activates the magnetic switch 34 and the motor 66 begins operation. The drum 54 with pins or rippers 56 begins the pulling or shredding of the food product 74 within the hopper 12. As pulled or shredded, the food product 74 exits the lower portion 38 of the hopper 12 in a pulled or shredded form and falls into the collection receptacle 72. The aforesaid process is repeated as necessary. Upon completion, the user removes the removable sidewall 18, the drum 54, and the comb strip(s) 40 in order to clean all portions of the apparatus 10 which came in touch with the food product 74. Thereafter, the aforesaid portions are reassembled and the apparatus 10 may be utilized for further pulling or shredding operations.

Although described for enablement purposes, the lengths, widths, and other dimensional attributes may depart significantly from those specified. The shape, size, location, component numbers and mounting methods utilized for the drum, pins or rippers, comb strips, or other components may take a plurality of forms as recognized within the pertinent arts without departing from the scope and spirit of the present invention.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. A meat pulling apparatus comprising:
   a hopper having an upper portion, a lower portion, an underside, and one or more sidewalls; and
   one or more meat stops substantially mounted with one or more of said sidewalls; and
   one or more comb strips substantially mounted with said lower portion; and
   a rotating drum having a plurality of pins or rippers; and
   said meat stops positioned to provide a first clearance to said drum and pins or rippers while allowing a thorough pulling or shredding of a food product and prohibiting one or more larger strips or portions of said food product from exiting said upper portion of said hopper during a rotation of said rotating drum; and
   said clearance from said meat stops to said drum and said pins or rippers sized to allow one or more pulled or shredded portions of said food product to enter said lower portion; and
   said comb strips positioned to substantially separate or clean said pulled or shredded portions of said food product from said drum and said pins or rippers.

2. The meat pulling apparatus as set forth in claim 1, further whereby:
   said drum with said plurality of pins or rippers is slightly smaller than a width and a length of said hopper upper portion; and
   said meat stops are positioned substantially parallel with a center axis of said drum and substantially tangential to a surface of said drum.

3. The meat pulling apparatus as set forth in claim 2, whereby:
   one or more of said comb strips have a plurality of teeth which are separated in order to provide a second clearance for said pins or rippers as said drum rotates.

4. The meat pulling apparatus as set forth in claim 3, further comprising:
   A feed cover sized to fit within said upper portion of said hopper and allow a user to impart a downward force onto said food product placed within said hopper; and
   said feed cover having a first portion representing a contact portion for said food product.

5. The meat pulling apparatus as set forth in claim 4, further comprising:
   a motor coupled with said drum; and
   one or more magnets mounted with said feed cover; and
   a magnetic switch electrically positioned with said motor and mechanically positioned to prohibit said motor from operation unless said cover with said one or more magnets is inserted into said upper portion of said hopper and a magnetic field of said magnet activates said magnetic switch, thereby promoting safety for said user.

6. The meat pulling apparatus as set forth in claim 5, further comprising:
   one or more support arms extending from said underside and capable of resting upon a surface, whereby said hopper is substantially supported relative to a collection receptacle.

7. The meat pulling apparatus as set forth in claim 6, whereby:
   said hopper has one or more removable walls of a size to allow removal of said drum whereby said drum and said hopper may be cleaned.

8. The meat pulling apparatus as set forth in claim 7, whereby:
   said drum has one or more extending shafts mounted within one or more bearings; and
   one or more of said extending shafts having a substantially square cross section capable of mating with a shaft coupler connected with said motor.

9. The meat pulling apparatus as set forth in claim 7, whereby:
   said feed cover is manufactured from a softer material than said pins or rippers; and
   said removable wall is held with said hopper via one or more quick disconnect fasteners.

10. The meat pulling apparatus as set forth in claim 9, whereby:
    said first portion of said feed cover has a partial radius or arcuate form.

11. The meat pulling apparatus as set forth in claim 10, further comprising:
    one or more extending lips capable of mating with said collection receptacle.

12. The meat pulling apparatus as set forth in claim 6, whereby:
    said drum has one or more extending shafts mounted within one or more bearings; and
    one or more of said extending shafts having a substantially square cross section capable of mating with a shaft coupler connected with said motor.

13. The meat pulling apparatus as set forth in claim 1, whereby:
    one or more of said comb strips have a plurality of teeth which are separated in order to provide a second clearance for said pins or rippers as said drum rotates.

14. The meat pulling apparatus as set forth in claim 1, further comprising:
    A feed cover sized to fit within said upper portion of said hopper and allow a user to impart a downward force onto said food product placed within said hopper; and
    said feed cover having a first portion representing a contact portion for said food product.

15. The meat pulling apparatus as set forth in claim 14, further comprising:
    a motor coupled with said drum; and
    one or more magnets mounted with said feed cover; and
    a magnetic switch electrically positioned with said motor and mechanically positioned to prohibit said motor from operation unless said cover with said one or more magnets is inserted into said upper portion of said hopper and a magnetic field of said magnet activates said magnetic switch, thereby promoting safety for said user.

16. The meat pulling apparatus as set forth in claim 15, whereby:
    said drum has one or more extending shafts mounted within one or more bearings; and one or more of said extending shafts having a substantially square cross section capable of mating with a shaft coupler connected with said motor.

17. The meat pulling apparatus as set forth in claim 14, whereby:
said first portion of said feed cover has a partial radius or arcuate form.

18. The meat pulling apparatus as set forth in claim 1, further comprising:
one or more support arms extending from said underside and capable of resting upon a surface, whereby said hopper is substantially supported relative to a collection receptacle.

19. The meat pulling apparatus as set forth in claim 1, whereby:
said hopper has one or more removable walls of a size to allow removal of said drum whereby said drum and said hopper may be cleaned.

20. The meat pulling apparatus as set forth in claim 19, whereby:
said feed cover is manufactured from a softer material than said pins or rippers; and
said removable wall is held with said hopper via one or more quick disconnect fasteners.

\* \* \* \* \*